United States Patent
Jo et al.

(10) Patent No.: US 8,103,444 B2
(45) Date of Patent: *Jan. 24, 2012

(54) SYSTEM AND METHOD FOR REDUCING COMMUNICATION LOAD OF APPARATUS FOR TRACKING MOVING OBJECT

(75) Inventors: Jung-Hee Jo, Daejeon (KR); Kyoung-Wook Min, Daejeon (KR); Ju-Wan Kim, Daejeon (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 744 days.

This patent is subject to a terminal disclaimer.

(21) Appl. No.: 12/182,770

(22) Filed: Jul. 30, 2008

(65) Prior Publication Data

US 2009/0018768 A1   Jan. 15, 2009

Related U.S. Application Data

(63) Continuation-in-part of application No. 12/096,761, filed as application No. PCT/KR2005/004667 on Dec. 30, 2005.

(30) Foreign Application Priority Data

Dec. 9, 2005   (KR) ........................ 10-2005-0120996

(51) Int. Cl.
   *G01C 21/00* (2006.01)
(52) U.S. Cl. ........ 701/204; 701/209; 701/300; 340/991; 340/994; 340/995.23
(58) Field of Classification Search .................. 701/204, 701/207–209, 211, 300; 340/988, 991, 994, 340/995.23; 342/357.74
See application file for complete search history.

(56) References Cited

U.S. PATENT DOCUMENTS 6,950,745 B2 *   9/2005   Agnew et al. ................. 701/210

FOREIGN PATENT DOCUMENTS

| JP | 2002-286473 A | 10/2002 |
|---|---|---|
| JP | 2002-286843 | 10/2002 |
| JP | 2003-207363 | 7/2003 |
| JP | 2004-280320 A | 10/2004 |
| JP | 2005-167811 | 6/2005 |
| KR | 10-2004-0050741 | 6/2004 |
| KR | 10-2005-0046035 | 5/2005 |

OTHER PUBLICATIONS

International Search Report for corresponding International Application No. PCT/KR2005/004667 dated Jul. 31, 2006.
Written Opinion of the Ineternational Searching Authority for corresponding International Application No. PCT/KR2005/004667 dated Jul. 31, 2006.

* cited by examiner

*Primary Examiner* — Gertrude Arthur Jeanglaude
(74) *Attorney, Agent, or Firm* — Kile Park Goekjian Reed & McManus PLLC

(57) ABSTRACT

Provided are a system and a method for reducing a communication load of an apparatus for tracking a moving object. The system includes: an estimated necessary time calculating unit receiving a current location and an arrival location of the moving object from a terminal included in the moving object, calculating estimated necessary time for the moving object to reach the arrival location, and transmitting the estimated necessary time to the terminal; and a communication path on-off controlling unit activating a communication path for the terminal to receive the estimated necessary time from the estimated necessary time calculating unit, and inactivating the communication path when the terminal receives the estimated necessary time through the communication path.

12 Claims, 3 Drawing Sheets

SYSTEM AND METHOD FOR REDUCING COMMUNICATION LOAD OF APPARATUS FOR TRACKING MOVING OBJECT

CROSS-REFERENCE TO RELATED PATENT APPLICATION

This application is a continuation-in-part of U.S. patent application Ser. No. 12/096,761, filed on Jun. 9, 2008, and claims the benefit of the filing dates of PCT/KR2005/004667, filed on Dec. 30, 2005 and Korean Patent Application No. 10-2005-0120996, filed on Dec. 9, 2005 in the Korean Intellectual Property Office, the disclosure of which is incorporated herein in its entirety by reference.

BACKGROUND OF THE INVENTION

1. Field of the Invention

The present invention relates to a system and a method for reducing a communication load of an apparatus for tracking a moving object, and more particularly, to a system and a method for reducing a communication load of a tracking apparatus in which an estimated necessary time for a moving object to move from a current location to an arrival location (destination) is calculated and then a communication path between the moving object to be tracked and the tracking apparatus is disconnected when the calculation of the estimated necessary time is completed.

2. Description of the Related Art

There are known three tracking methods. In the first method, a terminal of a moving object reports a location of the moving object to a tracking server (hereinafter, referred to as "platform") at constant time intervals. In the second method, the platform requests the terminal to send the location of the moving object. In the third method, when road data is available, the terminal reports the location of the moving object to the platform based on road segment information only when road segments are changed.

In the first method, the terminal reports its location to the platform every second or every minute and the platform processes data on the reported location. Accordingly, an excessive overloading of communication data load between the terminal and the platform can be caused. Therefore, the first method is not suitable for urgent cases with the need for urgency and accuracy.

In the second method, when the time interval at which the platform acquires the location of the terminal decreases, the platform requests the location of the terminal more frequently, and the terminal has to collect, calculate, and report the location information in response to the request. Accordingly, the excessive overloading of communication data load between the terminal and the platform may be caused like the first method. In addition, the platform needs to track the location of the terminal in real time, which is not supported by the second method.

In the third method, the terminal has to report the location of the terminal to the platform every road segment. So the more the number of road segments is, constituting the complex road increases. Accordingly, the frequency of reporting the location increases drastically. Therefore, in the third method, the frequency of reporting the location is less than that of the first or second method and the platform can track the terminal in real time. However, in case of a complex road, the communication load between the terminal and the platform may be increased like the first and second methods.

SUMMARY OF THE INVENTION

The present invention provides a system and a method for reducing a communication load of a platform for tracking a moving object by reducing the frequency of communications for reporting a location of a terminal of the moving object.

The present invention also provides a system for reducing a communication load of a location-tracking apparatus of a moving object, the system including: an estimated necessary time calculating unit receiving a current location and an arrival location of the moving object from a terminal included in the moving object, calculating estimated necessary time for the moving object to reach the arrival location, and transmitting the estimated necessary time to the terminal; and a communication path on-off controlling unit activating a communication path for the terminal to receive the estimated necessary time from the estimated necessary time calculating unit, and inactivating the communication path when the terminal receives the estimated necessary time through the communication path.

According to another aspect of the present invention, there is provided a method of reducing a communication load of a location-tracking apparatus for tracking a moving object, the method including: (a) receiving a current location and an arrival location of the moving object from a terminal included in the moving object, calculating an estimated necessary time for the moving object to reach the arrival location, and transmitting the estimated necessary time to the terminal; and (b) activating a communication path through which the terminal receives the estimated necessary time and inactivating the communication path when the terminal receives the estimated necessary time through the communication path.

A moving object occupant (a terminal user) inputs a current location and an arrival location of the moving object by the use of a terminal having a location detection module and reports the current location and the arrival location to a platform. The platform searches a geographic information database (DB) for location information on the current location and the arrival location, extracts all the possible paths, and calculates an estimated necessary time. The platform transmits the extracted paths and the estimated necessary time to the moving object (terminal).

The terminal calculates a difference in distance between the current location and an estimated location of the moving object detected in real time by the location estimation module built in the moving object on the basis of all the possible paths, the estimated necessary time, and the current location information of the moving object detected in real time by the location detection module. At this time, the current location of the moving object is reported only when the difference in distance is greater than a predetermined threshold value.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
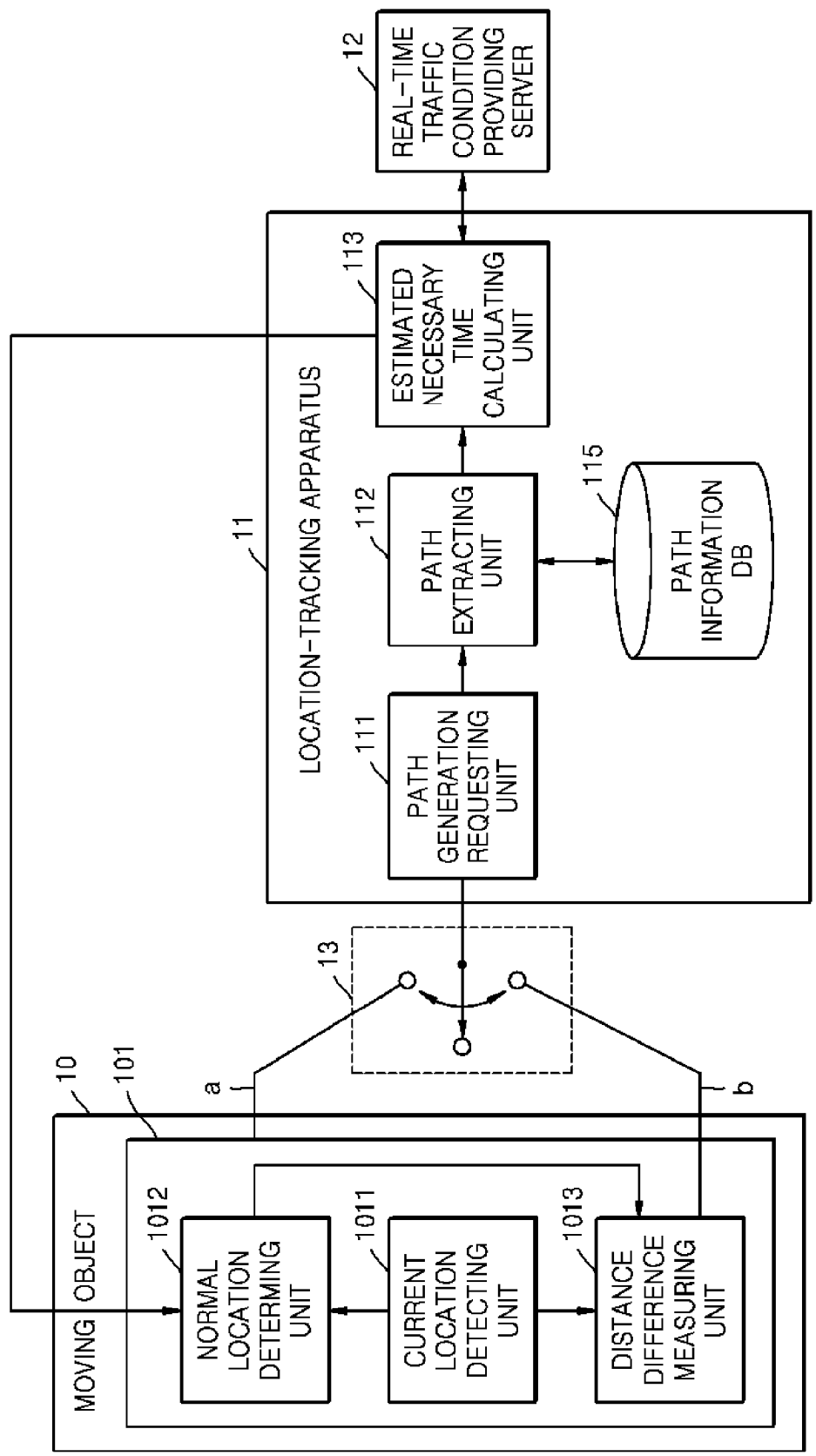
FIG. 1 shows a system according to an exemplary embodiment of the present invention.

Hereinafter, the present invention will be described in detail by explaining exemplary embodiments of the invention with reference to the attached drawings. Like reference numerals in the drawings denote like elements.

Figure 2:
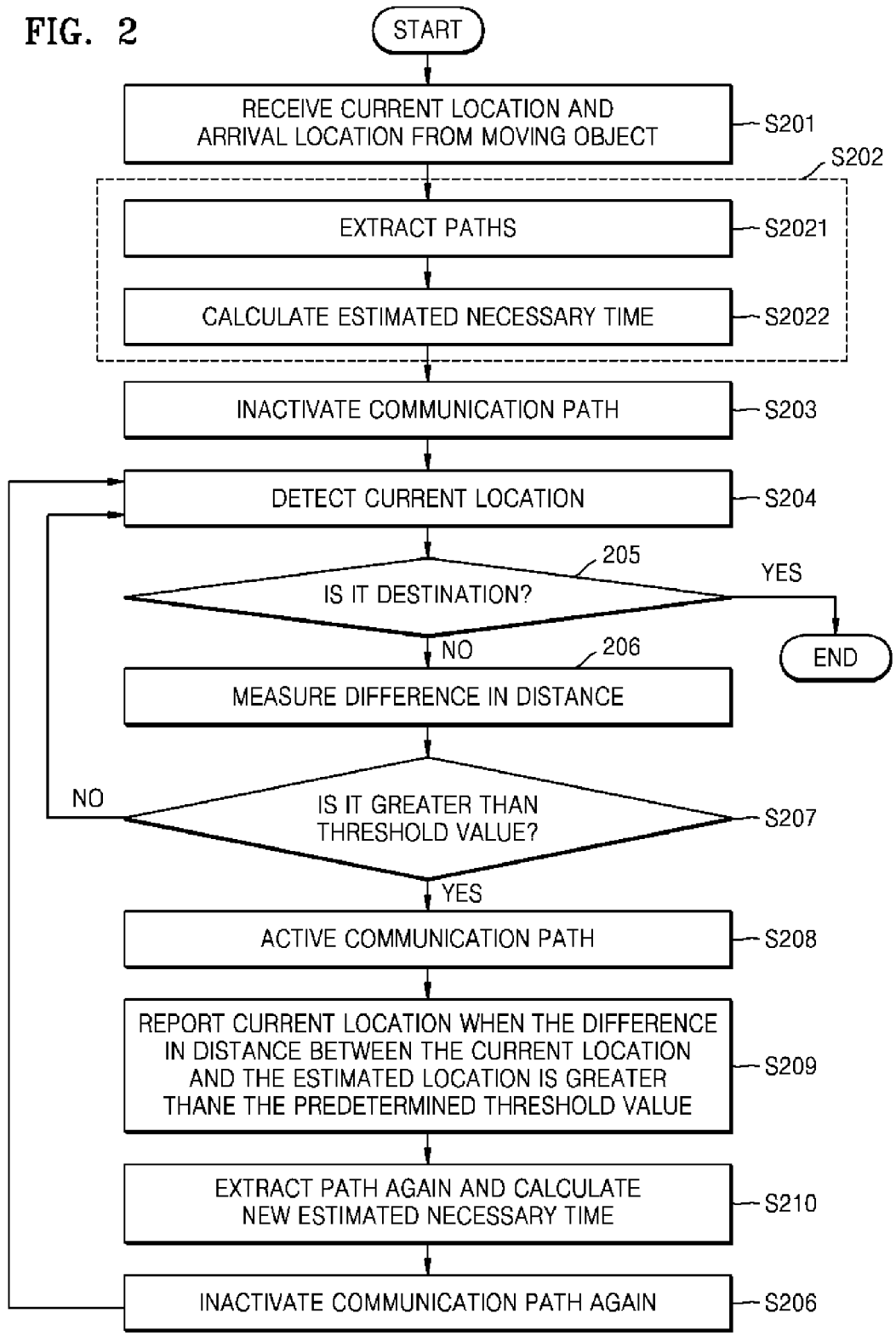
FIG. 2 is a flowchart of a method according to an exemplary embodiment of the present invention.

FIG. 1 shows an exemplary embodiment of a system according to the present invention and FIG. 2 shows an embodiment of a method according to the present invention.

A location-tracking apparatus 11 corresponds to the aforementioned platform. The location-tracking apparatus 11 extracts paths between the current location and the arrival location of a moving object 10 by receiving the current location and the arrival location (destination) from the terminal 101. Then the location-tracking apparatus 11 calculates the estimated necessary time to move from an arbitrary location on the extracted path to the arrival location.

For calculating the estimated necessary time, the location-tracking apparatus 11 includes a path generation requesting unit 111, a path extracting unit 112 and an estimated necessary time calculating unit 113. When a current location and an arrival location of a moving object 10 are reported from a terminal 101 located in a moving object 10 (S201), all the possible paths between the current location and the arrival location are extracted on the basis of the reported current location and arrival location and the estimated necessary time is calculated and transmitted to the terminal 101 (S202). The location-tracking apparatus 11 estimates the location of the moving object 10 in real-time by using a real-time location estimation algorithm. The estimated necessary time is calculated based on the estimated location.

Hereinafter, a function of tracking the moving object 10 performed by the path generation requesting unit 111, the path extracting unit 112, and the estimated necessary time calculating unit 113 will be described in detail. The path generation requesting unit 111 receives the current location and the arrival location from the terminal 101 located in the moving object 10, makes a request message for generating paths between both locations and transmits the request message to the path extracting unit 112.

The path extracting unit 112 receives the request message from the path generation requesting unit 111, accesses to a geographic database (DB), extracts all the possible paths between both locations, and transmits the extracted paths to the estimated necessary time calculating unit 113.

The estimated necessary time calculating unit 113 calculates the estimated necessary time to move from the arbitrary location to the arrival location of the moving object 10 with reference to the extracted paths and real-time traffic conditions and then transmits the calculation result together with the extracted path information to the terminal 101.

An exemplary embodiment of the present invention will be described in detail with reference to FIGS. 1 and 2.

The terminal 101 located in the moving object 10 transmits the current location and the arrival location of the moving object 10 through a reporting path a to the path generation requesting unit 111. The reporting paths a and b will be described clearly in the following. The terminal 101 includes an own current location detecting unit 1101 detecting the current location (real location) of the moving object 10 in real time, and the terminal user inputs the current location detected by the current location detecting unit 1101 and the arrival location of the terminal user through the terminal 101 and then transmits the inputs to the location-tracking apparatus 11.

The path generation requesting unit 111 makes the request message for generating paths including information on the current location and arrival location and transmits the request message to the path extracting unit 112. When the path extracting unit 112 extracts all the possible paths between both locations from the geographic DB (S2021), the path extracting unit 112 transmits the information on the current location and arrival location to a path information DB 115, receives coordinate information on all the possible paths between the current location and the arrival location, and extracts the paths between both locations.

The estimated necessary time calculating unit 113 receives all the possible paths extracted by the path extracting unit 112, accesses a real-time traffic condition providing server 12, and receives current traffic conditions. In addition, the estimated necessary time calculating unit 113 calculates the estimated necessary time for the moving object 10 to reach the arrival location from an arbitrary location, and transmits the calculation result together with the extracted path information to the terminal 101 (S2022).

When all the possible paths to the arrival location, the estimated necessary time, and so on are transmitted to the terminal 101, a communication path on-off controlling unit 13 inactivates the reporting paths a and b as a normal neutral state (the state at which both paths are not activated). The communication path on-off controlling unit 13 will be described more clearly in the following.

A normal location determining unit 1012 determines a normal location of the moving object 10 in an arbitrary location on the basis of all the possible paths to an arrival location transmitted from the location-tracking apparatus 11 and the estimated necessary time. Here, the normal location is a general location of the moving object 10 when all traffic conditions are normal.

A current location detecting unit 1011 detects the current location of the moving object 100 at the point in time when the estimated necessary time is transmitted as described above (S204). As a result of detection of the current location, it is determined whether the current location is a destination (arrival location) (S205). When the current location is not a destination, the difference in distance between a normal location and the current location is measured by the distance difference measuring unit 1013 (S206).

The distance difference measuring unit 1013 determines whether the difference in distance is greater than a threshold value (S207). When the distance difference between both locations is not greater than the predefined threshold value, the method moves to S204. When the distance difference between both locations is greater than the predetermined threshold value, the distance difference measuring unit 1013 generates an activation controlling signal so as to make the communication path on-off controlling unit 13 activate the communication path (reporting path) b. The distance difference measuring unit 1013 reports the current location through the reporting path b to the location-tracking apparatus 11 when the difference in distance between the current location and the estimated location is greater than the predetermined threshold value (S209).

The path from the new current location received from the distance difference measuring unit 1013 to the arrival location is newly extracted, and the estimated necessary time is newly calculated (S210) and transmitted to the terminal 101, by the function modules of the location-tracking apparatus 11 as described above. After the new estimated necessary time is transmitted to the terminal 101, the communication path on-off controlling unit 13 blocks the communication path again (S211). The terminal 101 and the location-tracking apparatus 11 estimates and tracks the location of the moving object 10 continuously by the use of the location estimation algorithm on the basis of the new path and estimated necessary time in real time until the moving object 10 reaches the destination (arrival location).

The communication path on-off controlling unit 13 is used for connecting one of the reporting communication paths a and b to the path generation requesting unit 111 and is included so as to reduce the communication load.

That is, the communication path on-off controlling unit 13 activates the reporting path a when a terminal user reports the current location and the arrival location to the location-tracking apparatus 11 through the terminal 101. The communication path on-off controlling unit 13 activates the reporting path b when the difference in distance between both locations is greater than the predetermined threshold value. The communication path on-off controlling unit 13 inactivates both reporting paths a and b in the other cases. Therefore, the communication path on-off controlling unit 13 can suppress unnecessary communications between the terminal 101 and the location-tracking apparatus 11.

When the extraction of the path and the calculation of the estimated necessary time are requested from the communication path on-off controller 13, that is, the aforementioned report is requested, the communication path on-off controlling unit 13 detects the report event and holds the communication state for reporting the current location and the arrival location from the terminal 101 to the location-tracking apparatus 11 to reduce the communication load.

The report event according to an embodiment of the present invention occurs only when the user inputs the current location and the arrival location and requests the location-tracking apparatus 11 to track the moving object or the difference in distance is greater than the predetermined threshold value, or so the location-tracking apparatus 11 has to calculate the estimated necessary time.

If the estimated necessary time calculating unit 113, the normal location determining unit 1012, the current location detecting unit 1011, and the distance difference measuring unit 1013 are integral parts of the terminal 101, the terminal 101 may be a system according to the present invention. That is, the present invention can be realized without communicating with the location-tracking apparatus 11 by including a procedure or an algorithm for calculating the estimated necessary time in the terminal 101. In the present embodiment, the function of the communication path on-off controlling unit 13 may be included in the terminal 101, and this may be optional in design.

The concrete method of realizing the present invention when the system according to the present invention is integrally included in the terminal 101 is equal to that of the above embodiment, and thus a description thereof is not provided.

Figure 3:
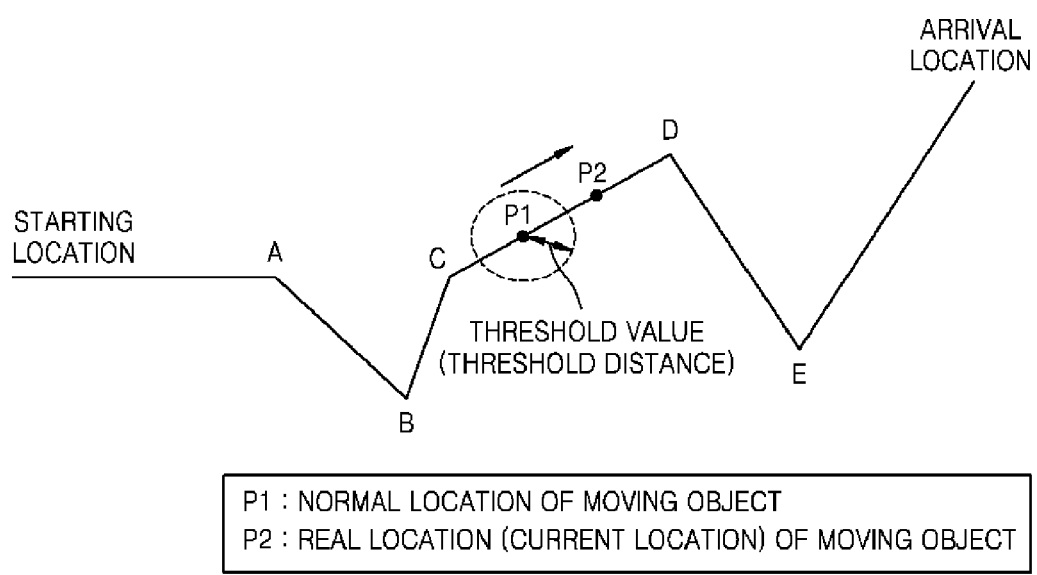
FIG. 3 shows an example of the present invention in relation to a path (road).

FIG. 3 shows an example according to the present invention in relation to a path (road).

For example, when the moving object 10 having the terminal 101 desires to move from a predetermined starting location to the arrival location, the terminal 101 detects the current location through the current location detecting unit 1011 and transmits the detection result together with current speed information to the location-tracking apparatus 11, and the path extracting unit 112 in the location-tracking apparatus 11 accesses to the geographic DB 115 and extracts all the possible paths between the starting location and the arrival location.

In a case where the terminal 101 reports the current location of the moving object 10 to the location-tracking apparatus 11 and the location of the terminal 101 is estimated only when the segment is changed based on the road segment (A->B->C->D->E) information, that is, in case of the aforementioned third method, though the moving object 10 does not deviates from the range of the threshold value, the difference in distance between the current location and the estimated location of the moving object 10 is smaller than the predetermined threshold value, the current location of the moving object 10 has to be reported to the server whenever the segment is changed.

However, according to the method of the present invention, the report event occurs only when the difference in distance between the current location at a predetermined time and the normal location at the predetermined time is greater than the threshold value (threshold distance) regardless of the road configuration. Accordingly, when the difference in distance is not greater than the threshold value, the location-tracking apparatus 11 estimates the location of the moving object 10 in real time without additional location reports, in interaction with the normal location determining unit 1012. Therefore, the present invention has the great advantage to reduce the communication load, specifically when the number of the segments constituting the road is large.

The invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims.

The exemplary embodiments should be considered in descriptive sense only and not for purposes of limitation. Therefore, the scope of the invention is defined not by the detailed description of the invention but by the appended claims, and all differences within the scope will be construed as being included in the present invention.

According to the present invention, it is possible to drastically reduce the frequency of communication between the terminal and the server and reduce the communication load on the server, by calculating an error between the current location and the normal location at a specific time on the basis of the estimated necessary time of the moving object and allowing the terminal to report its location to the server only when the error is greater than the predetermined threshold value.

In addition, according to the present invention, it is possible for the server to estimate the location of the moving object by the use of a location estimation algorithm, without any additional communication between the server and a mobile communication network or a tracking device. Therefore, when a service provider requests the platform for the location of the moving object, the server can provide the location of the moving object in real time on the basis of the estimation data without any additional communication with the terminal.

What is claimed is:

1. A system for reducing a communication load of a location-tracking apparatus of a moving object, the system comprising:
    an estimated necessary time calculating unit receiving a current location and an arrival location of the moving object from a terminal included in the moving object, calculating estimated necessary time for the moving object to reach the arrival location, and transmitting the estimated necessary time to the terminal; and a communication path on-off controlling unit activating a communication path for the terminal to receive the estimated necessary time from the estimated necessary time calculating unit, and inactivating the communication path when the terminal receives the estimated necessary time through the communication path.

2. The system of claim 1, further comprising:
a path generation requesting unit receiving the current location and the arrival location and making a path generation requesting message between the current location and the arrival location; and
a path extracting unit receiving the path generation requesting message and extracting all the possible paths connecting the current location and the arrival location,
wherein the estimated necessary time calculating unit calculates the estimated necessary time with reference to the extracted paths and real-time traffic conditions.

3. The system of claim 2, further comprising:
a normal location determining unit receiving the current location of the moving object detected in real time, the extracted paths, and the estimated necessary time and determining a normal location of the moving object; and
a distance difference measuring unit determining in real time whether a difference in distance between the current location and the normal location is greater than a threshold value and generating a reactivation controlling signal of the inactivated communication path only when the difference in distance between the both locations is greater than the threshold value.

4. The system of claim 3, wherein, when the difference in distance is greater than the threshold value, the distance difference measuring unit transmits the controlling signal to the communication path on-off controlling unit and reactivates the inactivated communication path in order to report the current location to the path generation requesting unit, and the path extracting unit extracts new paths between the current location and the arrival location when the difference in distance between the both locations is greater than the threshold value, the estimated necessary time calculating unit calculates a new estimated necessary time and transmits the new estimated necessary time to the normal location determining unit, and the communication path on-off controlling unit inactivates the reactivated communication path again.

5. A method of reducing a communication load of a location-tracking apparatus for tracking a moving object, the method comprising:
(a) receiving a current location and an arrival location of the moving object from a terminal included in the moving object, calculating an estimated necessary time for the moving object to reach the arrival location, and transmitting the estimated necessary time to the terminal; and
(b) activating a communication path through which the terminal receives the estimated necessary time and inactivating the communication path when the terminal receives the estimated necessary time through the communication path.

6. The method of claim 5, wherein operation (a) comprises:
(a1) allowing the tracking apparatus to receive a path generation requesting message between a current location and an arrival location from the terminal, and extracting all the possible paths connecting the current location and then arrival location; and (a2) calculating the estimated necessary time by the tracking apparatus on the basis of the extracted paths and real time traffic conditions and transmitting the calculation result to the terminal.

7. The method of claim 6, wherein operation (b) comprises:
(b1) transmitting the estimated necessary time to the terminal to inactivate a communication path for the reports;
(b2) determining the current location of the moving object detected in real time and a normal location of the moving object with reference to the extracted paths and the estimated necessary time;
(b3) determining whether a difference in distance between the current location and the normal location is greater than a threshold value, and reactivating the inactivated communication path only when the difference in distance between the both locations is greater than the threshold value.

8. The method of claim 7, further comprising:
(b4) extracting new paths between the current location and the arrival location when the difference in distance between the both locations is greater than the threshold value;
(b5) calculating a new estimated necessary time and transmitting the calculation result to the terminal; and
(b6) inactivating the reactivated communication path again.

9. A computer-readable recording medium having embodied thereon a program for executing the method of claim 5,6,7, or 8.

10. A system for reducing a communication load of a location-tracking apparatus of a moving object, the system comprising:
an estimated necessary time calculating unit calculating estimated necessary time for the moving object to reach an arrival location from a current location;
a normal location determining unit determining the current location detected in real time and a normal location of the moving object by the use of the estimated necessary time calculated by the estimated necessary time calculating unit; and
a communication path on-off controlling unit allowing the normal location determining unit to activate a communication path through which the estimated necessary time is transmitted from the estimated necessary time calculating unit, transmitting the estimated necessary time through the communication path to the normal location determining unit, and inactivating the communication path.

11. The system of claim 10, further comprising:
a distance difference measuring unit determining in real time whether a difference in distance between the current location and the normal location is greater than a threshold value,
wherein the communication path on-off controlling unit reactivates the inactivated communication path only when the difference in distance between the current location and the normal location is greater than the threshold value.

12. The system of claim 11, wherein, when the difference in distance between the current location and the normal location is greater than the threshold value, the estimated necessary time calculating unit calculates a new estimated necessary time and transmits the calculation result to the normal location determining unit and the current location detecting unit, and the communication path on-off controlling unit inactivates the reactivated communication path again.

* * * * *